Patented July 21, 1925.

1,546,606

UNITED STATES PATENT OFFICE.

CLIFFORD B. PAPE, OF CHICAGO, ILLINOIS.

PRESERVATIVE COATING FOR NUT KERNELS.

No Drawing. Application filed November 29, 1924. Serial No. 752,933.

*To all whom it may concern:*

Be it known that I, CLIFFORD B. PAPE, a citizen of the United States, residing at Chicago, in the county of Cook and State of Illinois, have invented certain new and useful Improvements in Preservative Coatings for Nut Kernels; and I do hereby declare the following to be a full, clear, and exact description of the invention, such as will enable others skilled in the art to which it appertains to make and use the same.

This invention has for its object to provide a preserved nut kernel and a preservative coating compound for the same.

Shelled, edible nuts are dependent for excellence and preservation of flavor upon a given moisture content lying between that which is found in substantially freshly ripened nuts as a maximum, and a minimum percentage, the maximum and minimum percentages differing according to the type of nut.

In the shelling of nuts, many kernels are more or less fractured, the common practice in the industry being to package the meats and place them in cold storage preparatory to marketing. In storage, molding is not infrequent and it has been found that this starts at the fractures of the meats. Where mold does not form it is usually due to such dry atmosphere as serves to dry out the meats. The large consumers of shelled nuts, such as bakers and candy manufacturers, purchase the same in sufficient quantity to meet requirements for a considerable period and, generally, store the same where convenient without regard to atmospheric conditions, except to avoid damp resulting in mold. The normal desirable moisture content of the meats is thus rapidly reduced and, at fractures, causes a flour- or chalk-like condition to obtain which not only deteriorates flavor, but is highly disagreeable to the taste.

Lack of sufficient moisture in the meats also renders them brittle and this is particularly undesirable in the case of the larger kernels, such as Brazil nuts, which are largely sliced for decoration of cakes and candies, as brittleness causes the slices to break in the act of severing the same from the body of the kernel.

In the case of blanched Brazil nuts and blanched almonds, for example, a certain percentage of the meats will have membrane adhering thereto in spots at least. As these nuts are packed most generally in barrels which are rolled in shipping, the said membrane is flaked off by the frictional contact of kernals and these flakes become distributed like a coarse dirt over the clean blanched kernels to render them unclean in appearance.

Nut meats are also hygroscopic, subject to rancidity unless maintained cold, and develop weevils in ordinary room temperatures. In damp atmospheres at substantially room temperatures, the meats spoil very quickly and the lack of proper storage facilities among dealers and consumers and the high cost and risks attendant upon cold storage by producers has rendered necessary the practice of shelling only in volume sufficient to meet the immediate market demands. When the latter is at its peak, as preceding the Christmas holidays, the shelling plants are operated twenty-four hours a day, while at other times they are almost entirely idle. This irregularity of operation is equally disadvantageous to employers and employees and also to consumers whose peak demands cannot always be met.

A further disadvantage of present day methods lies in the fact that in most instances the meats must be dried after shelling and before placing in cold storage, in order to reduce the moisture content to a point at which molding is practically obviated. This dehydration is usually of a degree which deleteriously affects the flavor.

The particular object of the present invention is to provide means, for cheaply and effectively preserving the nut-meats so that they will retain indefinitely and in the presence of all kinds of atmospheric conditions ordinarily encountered between the time of shelling the nuts and the consumption thereof, the exact condition as to moisture content, flavor, elasticity and appearance, inherent thereto at the moment of shelling, and obviate mold, weevils, hydration and dehydration, loss of flavor, rancidity and change of appearance or surface condition.

The invention consists essentially in coating the kernels, immediately after shelling, with an edible, non-hygroscopic and preferably waterproof substance having a relatively high melting point, which is also quite hard when dry, presents a very smooth glacé-like surface and adheres to the kernel with sufficient tenacity to resist flaking off by the frictional contact of the kernels with each other in the packages, particularly barrels, as aforesaid.

I prefer to employ for the purpose an edible, vegetable gum of a variety which is not soluble in water and which is free from arsenic or other drugs or poisons. The gum known commercially as arsenic-free white lac is very well suited to the purpose.

A solution of this gum is formed by first adding to one hundred parts, by weight, of ethyl alcohol, from one to five parts, by weight, of ethyl acetate. To this solution there is added from about eight to about twelve parts, by weight, of the said gum.

Dipping of the nut-meats in the said solution, and the drying of the same, is accomplished in any well-known manner, as, for example, by placing the meats on a coarse-mesh woven-wire support which is immersed in the solution and then disposed to drain surplusage back into the container for the same while drying, the latter progressing very rapidly owing to the highly volatile constituents of the solution.

The resulting product presents a glazed appearance, retains the characteristics possessed thereby at the time of coating with respect to moisture content, flavor, color, etc., may be stored in dry or damp places without deterioration or molding, and may be handled in barrels and other packages without change of appearance due to the flaking away of membranes of the kernels.

The foregoing solution or compound is merely exemplary of one that is very well suited to the purpose. In practice, a gallon of said solution including four lbs., more or less, of the gum, suffices to coat from 150 to 300 lbs. of kernels, depending upon the size and general contour of the latter, the larger quantity being exemplified in Brazil nut kernels.

This coating of the nut-meats is further of great advantage, in that it permits the shelling of nuts to proceed far in advance of heavy demands for the shelled product, thereby promoting more regular and continuous employment of labor during regular working hours, purchases by consumers and dealers of larger quantities than just sufficient to meet requirements of a few days with consequent economies of shelling, handling, shipping, storage and spoilage costs.

I claim as my invention:

1. As a new article of manufacture, a nut kernel provided with a preservative coating consisting of arsenic free white shellac possessing the characteristics of edibility, tenacity, hardness, insolubility in water, having a relatively high melting point and presenting a smooth glossy surface which will not chip or flake under the influence of friction.

2. A preservative coating compound for nut kernels consisting of arsenic-free white lac, ethyl acetate and ethyl alcohol.

3. A preservative coating compound for nut kernels consisting by weight of approximately ten parts arsenic-free white lac, approximately three parts ethyl acetate and approximately one hundred parts ethyl alcohol.

In testimony whereof, I have hereunto set my hand this 17th day of November, 1924.

CLIFFORD B. PAPE.